April 1, 1958     T. F. DOUMANI     2,829,171
PREPARATION OF MERCAPTANS AND SULFIDES
Filed Oct. 26, 1953
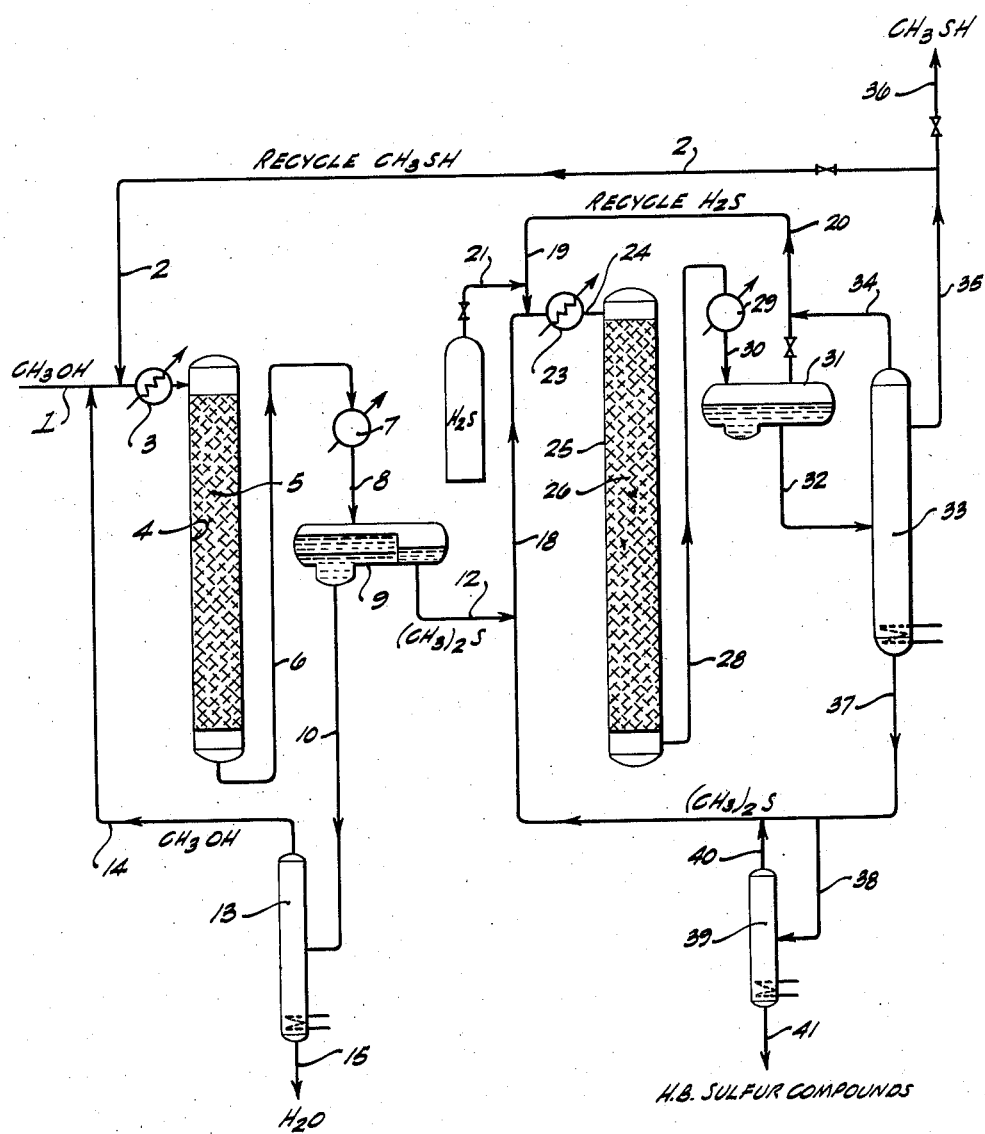
INVENTOR.
THOMAS F. DOUMANI,
BY
Lannas S. Henderson
AGENT.

2,829,171

PREPARATION OF MERCAPTANS AND SULFIDES

Thomas F. Doumani, Whittier, Calif., assignor to Union Oil Company of California, Los Angeles, Calif., a corporation of California Application October 26, 1953, Serial No. 388,221

13 Claims. (Cl. 260—609)

This invention relates to the synthesis af lower aliphatic mercaptans from raw materials consisting of lower alkanols and hydrogen sulfide. In particular it relates to the preparation of methyl mercaptan from methanol and hydrogen sulfide. When those materials are reacted directly in the presence of a catalyst at temperatures between about 400° and 1200° F., several different reactions may take place. Some of these are as follows:

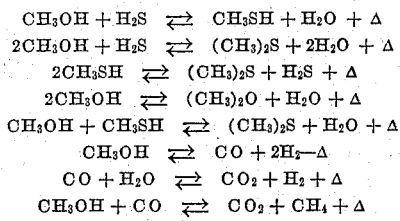

The present invention is directed primarily to the use of certain catalysts in two separate contacting stages whereby the direct interaction of the alcohol with hydrogen sulfide is avoided, thereby minimizing or eliminating certain of the above side reactions, and completely avoiding the simultaneous presence of hydrogen sulfide and water in the reaction system. In the first contacting stage a part of the mercaptan produced in the second stage is reacted with the alcohol in the absence of hydrogen sulfide to produce the corresponding sulfide as follows:

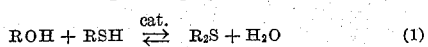

The disulfide produced in the first stage is then condensed, separated from the water of reaction, and passed to the second stage wherein it is reacted at high temperatures with hydrogen sulfide in the absence of water or alcohol. The reaction which takes place in the second stage is as follows:

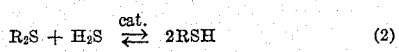

The mercaptan produced in the final stage is then divided into a product stream and a recycle stream, the latter of which is returned to the first stage. This particular combination of steps is found to give several advantageous results.

In the absence of hydrogen sulfide reaction No. 1 proceeds extremely rapidly and goes essentially to completion at temperatures above about 600° F. If hydrogen sulfide is present the reaction proceeds at a slower rate, and there are more competing side-reactions. Moreover the simultaneous presence of water and hydrogen sulfide in either stage of the process is disadvantageous because the resulting acidic mixture is more highly corrosive to the metallic walls and fittings of the apparatus employed.

Reaction number 2 above is found to be thermodynamically feasible only at temperatures above about 700° F. and in the presence of an adsorbent catalyst. At lower temperatures the equilibrium is too far to the left to obtain practical yields of mercaptan. By excluding water and hydroxyl groups from this stage of the process, all the above side reactions which might result in the production of equilibrium amounts of methanol, carbon monoxide and carbon dioxide are eliminated. The second reaction is somewhat slower than reaction 1 but nevertheless takes place at appreciable rates in the presence of the catalysts herein described and under the conditions described.

If hydrogen sulfide and methanol are reacted together directly, it is necessary to employ a large excess of either hydrogen sulfide or dimethyl sulfide in order to repress side reactions leading to the formation of dimethyl sulfide. By employing the reaction sequence described herein, the molar proportions of excess reagents necessary for driving the reactions to adequate completion are materially reduced. In the first stage of the process the methanol and methyl mercaptan may be in approximately equimolar proportions. In the second stage of the process it is preferable to employ an excess of methyl sulfide in order to more completely utilize the hydrogen sulfide. However, the total amount of recycled products per mole of fresh methanol is substantially less in the two stage process described herein than would be required to obtain the same conversion to mercaptan in a single stage process.

From the above discussion it will be seen that one of the principal objects of this invention is to decrease the number of competing side reactions taking place at any given point in the process, thereby accelerating the desired reactions and increasing the conversion per pass. Another object is to decrease the thermal degradation of methanol into carbon monoxide and carbon dioxide by limiting the presence of that reactant to a stage of the process which may be conducted extremely rapidly, and/or at relatively low temperatures. A still further object is to eliminate or decrease the corrosiveness of the reactant materials. Another object is to increase the capacity of the reactor by decreasing the total molar proportion of recycle ingredients. Other objects and advantages will be apparent to those skilled in the art from the more detailed description which follows:

The catalysts employed herein may or may not be the same in both stages. Active catalysts include primarily the adsorbent oxides such as activated alumina, magnesia, titania, zirconia, silica, bauxite, beryllia, acid activated clays such as acid washed montmorillonites, calcium oxide, strontium oxide, barium oxide and the like. The corresponding adsorbent metal sulfides may also be employed. Mixtures of the above materials may also be employed. The preferred catalysts are activated aluminas, either alone or in combination with other oxides such as silica, titania, zirconia, magnesia, calcium oxide, boria, etc.

In either stage of the process, and particularly in the second stage, it may be desirable to add certain promoter compounds to the catalyst such as the oxides or sulfides of chromium, molybdenum, tungsten, iron, cobalt, nickel, copper, tin, cadmium, etc. These promoters may be added to the primary catalyst by any of the methods known in the art, e. g. impregntaion with aqueous solutions of their salts, co-pilling of the powdered materials, co-precipitation, sublimation, etc. Proportions of these promoters ranging between about 1% and 20% by weight of the finished catalyst may be employed. A particularly desirable addition consists of about 1–5% of chromium trioxide. This latter material, in addition to any promoting effect, also acts as an oxidizer keeping the catalyst essentially free of coke. The finished catalyst may be employed in the form of a powder, granules, pellets, etc. ranging in size from about 4–400 mesh.

The process may perhaps be more readily understood by reference to the accompanying drawing which is a flowsheet for one modification of the process. In the procedure illustrated methanol from storage is brought in through line 1, admixed with the proper proportion of recycle methyl mercaptan from line 2 and the mixture is vaporized and preheated to the desired reaction-initiating temperature in heater 3. This temperature may range between about 300° and 1000° F. The reaction-initiating temperature does not however coincide with the average or maximum temperatures required for the reaction. The latter temperatures are attained exothermically in reactor 4. Maximum temperatures therein may range between about 600° and 1100° F., and preferably between about 700° and 1050° F., and may be attained adiabatically if desired. The mole ratio of methanol to methyl mercaptan may range between about 10/1 and 1/10, and preferably between about 1/2 and 2/1. It is preferable to employ a slight excess of mercaptan, e. g. 10 mole percent, in order to utilize completely the methanol, thereby simplifying the recovery system.

The preheated, gaseous feed mixture is passed into reactor 4 which is packed with a suitable granular catalyst 5. The space velocity of the reactants through reactor 4 may vary between about 2 and 100 liquid volumes per volume of catalyst per hour, and preferably between about 5 and 30 volumes. The higher space velocities will be employed at higher temperatures, and/or with highly active catalysts which have a large surface area. Pressure in the reactor may range between about 0 and 1000 p. s. i. g. and preferably from about atmospheric to 100 p. s. i. g.

The products from reactor 4 are taken off through line 6 and condensed in condenser 7. The condensed products are then passed through line 8 into liquid-liquid separator 9 wherein the aqueous phase settles to the bottom and is removed through line 10. The supernatant organic phase, which consists principally of dimethyl sulfide together with smaller proportions of methyl mercaptan, is withdrawn through line 12. The aqueous phase in line 10 may ordinarily be discarded, but it may in some cases be desirable to treat it for recovery of any excess unreacted methanol. This may be accomplished by distillation in column 13, from which methanol is removed overhead through line 14 and recycled to line 1, while the bottoms consisting essentially of water is taken off through line 15.

The methyl sulfide in line 12 is then admixed with excess recycle methyl sulfide from line 18 and the combined stream is then admixed with the desired proportion of liquid or gaseous hydrogen sulfide from line 19. The hydrogen sulfide in line 19 consists partly of recycle $H_2S$ from line 20 and fresh makeup $H_2S$ from line 21. The total amount of hydrogen sulfide added should preferably be between about 0.1 and 0.5 mole thereof per mole of total dimethyl sulfide admixed therewith. This tends to drive the reaction to completion and it also simplifies the recovery system by providing a predominantly liquid product.

The mixed dimethyl sulfide plus hydrogen sulfide is then passed through a heater 23 wherein it is vaporized and heated to the reaction temperature for the second stage of the reaction. The preheated mixture is then passed through line 24 into catalytic reactor 25 which is packed with a suitable granular catalyst 26. Suitable reaction temperatures may range between about 700° and 1100° F., and preferably between about 900° and 1050° F. Maximum temperatures in the reactor may range between about 700° and 1200°. The liquid hourly space velocity of dimethyl sulfide in reactor 25 may vary between about 5 and 25, and preferably between about 10 and 15 volumes thereof per volume of catalyst per hour. Under the preferred conditions, and employing a 4/1 mole ratio of dimethyl sulfide to $H_2S$, conversions ranging between about 10% and 25% may ordinarily be obtained in reactor 25, based on dimethyl sulfide converted to methyl mercaptan. Pressures in reactor 25 may range between about 0 and 500 p. s. i. g. and preferably between about 50 and 200 p. s. i. g.

The reaction gases from reactor 25 are removed through line 28, condensed in condenser 29 and admitted via line 30 to gas-liquid separator 31. Excess unreacted hydrogen sulfide is taken off through line 20 and recycled to line 18 as previously described. The condensed liquid phase in separator 31 consists principally of methyl mercaptan, dimethyl sulfide and small amounts of dissolved $H_2S$. This mixture is passed via line 32 to distillation column 33. Any remaining traces of hydrogen sulfide are taken off as light overhead through line 34 to be admixed with the main $H_2S$ recycle stream in line 20. A side cut from column 33 is taken off through line 35, and this consists of the crude methyl mercaptan product. This stream is split into (1) a product stream in line 36 and (2) a recycle stream in line 2. The relative volumes of product and recycle streams depends upon the mole ratio of methyl mercaptan to methanol which is desired for the first stage. Preferably the net product stream in line 36 amounts to about 30-70% of the gross product stream in line 35. This will provide a mole ratio of recycle methyl mercaptan to methanol of between about 2/1 and 1/2 as preferred.

The bottoms from column 33 consists mainly of dimethyl sulfide and any heavy polymers which may have been formed. This material is recycled through line 37 and line 18 to reactor 25 as previously described. It may be desirable to remove a slip stream from this recycle stream through line 38 and subject it to distillation in column 39, wherein purified dimethyl sulfide is taken overhead through line 40 and readmitted to the main recycle stream in line 37. The heavier material is removed as bottoms through line 41, and is discarded or otherwise utilized.

While the above process scheme has been described with particular reference to methyl mercaptan, essentially the same arrangement may be employed for producing other lower alkyl mercaptans such as ethyl mercaptan, propyl mercaptan, butyl mercaptan, isobutyl mercaptan, etc. from the corresponding alcohols. Those skilled in the art will readily understand also that the details described above may be varied considerably without departing from the essential scope of the invention.

The specific results obtainable by the procedures described herein may be illustrated by the following examples, which should not however be considered as limiting in scope.

EXAMPLE I

This example illustrates specifically the conversions obtainable in the first stage of the process. Several different reaction conditions are employed as illustrated in the table. In all cases, a vertical, tubular reactor composed of stainless steel, one inch in inside diameter is employed. The reactor is packed with approximately 200 ml. of the respective catalyst in granular form. The feed mixture having the composition shown is vaporized and preheated to the reaction temperature as indicated. The pressure is 100 p. s. i. g. in all cases. The results obtained are as follows:

Table

| Run No. | Liquid hourly space velocity, total reactants | Catalyst | Temp., °F. Inlet | Temp., °F. Max. | Mole ratio $CH_3SH/CH_3OH$ | Conversion, percent of $CH_3OH$ to $(CH_3)_2S$ |
|---|---|---|---|---|---|---|
| 1 | 10 | 95% $Al_2O_3$, 5% $SiO_2$ | 400 | 870 | 1:1 | 96 |
| 2 | 10 | $Al_2O_3$ | 400 | 860 | 1:1 | 95 |
| 3 | 14 | $Al_2O_3$ | 350 | 920 | 1:1 | 95 |
| 4 | 25 | $Al_2O_3$ | 450 | 1,000 | 1:1 | 93 |
| 5 | 2 | $SiO_2$ | 400 | 890 | 1:1 | 55 |
| 6 | 2 | $Al_2O_3$ | 400 | 860 | 1:1 | 78 |
| 7 | 5 | Soda-lime | 400 | 850 | 1:1 | 80 |

It will be seen from the above data that very high conversions and yields are obtained at very short contact times. If the contact times are extended, as in run No. 5, the yields and conversions tend to drop off because of the increasing importance of the slower side reactions. It is important also to maintain a maximum temperature of above 600° F. in order to prevent the formation of dimethyl ether.

EXAMPLE II

This example illustrates specific conditions and results obtainable in the second stage of the reaction. The catalyst consists of a synthetic activated alumina gel containing about 1% $Cr_2O_3$ in the form of approximately 1/8 inch granules. The apparatus arrangement is similar to that described in Example I. Dimethyl sulfide and hydrogen sulfide are admixed in a mole ratio of about 3.5 to 1, vaporized and preheated to a reaction temperature of 800° F. and passed over the catalyst at a space velocity of 11.7 volumes of dimethyl sulfide per volume of catalyst per hour. The pressure is 100 p. s. i. g. The product gases are condensed and anlalyzed for dimethyl sulfide and methyl mercaptan. The results show a 17% conversion of methyl sulfide to methyl mercaptan, and a yield of 87% based on the dimethyl sulfide consumed. About 51% of the hydrogen sulfide taken is converted to mercaptan.

By substituting other of the above described catalysts in either of the above examples substantially the same results are obtained. Higher conversions of hydrogen sulfide are obtained in Example II when higher mole ratios of methyl sulfide are present in the feed gases.

The foregoing disclosure is not to be considered as limiting the scope of the invention since many variations may be made by those skilled in the art without departing from the scope or spirit of the following claims:

I claim:

1. A process for preparing lower alkyl mercaptans which comprises passing a mixture comprising a lower alkanol and a lower alkyl mercaptan over an adsorbent oxide catalyst in a first reaction zone at a temperature between about 600° and 1100° F., separating the product gases into an essentially water-free alkyl sulfide stream and an essentially alkyl sulfide-free aqueous stream, passing said alkyl sulfide stream in admixture with hydrogen sulfide over an adsorbent oxide catalyst in a second reaction zone at a temperature between about 700° and 1200° F., recovering alkyl mercaptan from the product stream from said second reaction zone, and recycling a portion of said mercaptan to said first reaction zone, the reactants in said first reaction zone being substantially free of hydrogen sulfide, and the reactants in said second reaction zone being substantially free of lower alkanol.

2. A process according to claim 1 wherein the mole ratio of mercaptan to alkanol in said first reaction zone is between about 1/2 and 2/1.

3. A process as defined in claim 1 wherein the mole ratio of hydrogen sulfide to dialkyl sulfide in said second reaction zone is between about 0.1 and 0.5.

4. A process as defined in claim 1 wherein the space velocity in said first reaction zone is between about 5 and 30 volumes of liquid feed per volume of catalyst per hour.

5. A process as defined in claim 1 wherein said adsorbent oxide catalyst is essentially an activated gel-type alumina.

6. A process for preparing a lower alkyl sulfide which comprises passing a substantially hydrogen sulfide-free mixture of a lower alkyl mercaptan and a lower alkanol over an adsorbent oxide catalyst at a temperature between about 600° and 1100° F. and a space velocity between about 5 and 30 volumes of liquid feed per volume of catalyst per hour, and recovering dialkyl sulfide from the reaction product.

7. A process as defined in claim 6 wherein the mole ratio of said mercaptan to said alkanol is between about 1/2 and 2/1, and wherein said catalyst is essentially an activated gel-type alumina.

8. A process for preparing methyl mercaptan which comprises passing a vaporous mixture of methanol and methyl mercaptan over an adsorbent oxide catalyst in a first reaction zone at a temperature between about 600° and 1100° F., separating the product gases into an essentially water-free methyl sulfide stream and an essentially methyl sulfide-free aqueous stream, passing said methyl sulfide stream in admixture with hydrogen sulfide over an adsorbent oxide catalyst in a second reaction zone at a temperature between about 700° and 1200° F., recovering methyl mercaptan from the product stream from said second reaction zone, and recycling a portion of said methyl mercaptan to said first reaction zone, the reactants in said first reaction zone being substantially free of hydrogen sulfide, and the reactants in said second reaction zone being substantially free of methanol.

9. A process according to claim 8 wherein the mole ratio of methyl mercaptan to methanol in said first reaction zone is between about 1/2 and 2/1.

10. A process as defined in claim 8 wherein the mole ratio of hydrogen sulfide to dialkyl sulfide in said second reaction zone is between about 0.1 and 0.5.

11. A process as defined in claim 8 wherein the space velocity in said first reaction zone is between about 5 and 30 volumes of liquid feed per volume of catalyst per hour.

12. A process as defined in claim 8 wherein said adsorbent oxide catalyst is essentially an activated gel-type alumina.

13. A process for preparing a lower alkyl sulfide which comprises passing a vapor phase mixture consisting of from 1/2 to 2 mols of a lower alkanol and 1 mol of a lower alkyl mercaptan over an activated alumina gel catalyst at about 320° C. and recovering the lower alkyl sulfide.

References Cited in the file of this patent

UNITED STATES PATENTS 2,667,515    Beach et al.   --------------- Jan. 26, 1954

OTHER REFERENCES

Fehnel et al.: 71, J. A. C. S. (1949), page 92.